United States Patent [19]

Meier et al.

[11] 4,427,605

[45] Jan. 24, 1984

[54] TRAY DEVICE FOR COLLECTING AND DISTRIBUTING LIQUID FOR A COUNTER-CURRENT COLUMN

[75] Inventors: Werner Meier, Elgg; Robert Hunkeler, Dielsdorf, both of Switzerland

[73] Assignee: Sulzer Brothers Limited, Winterthur, Switzerland

[21] Appl. No.: 355,328

[22] Filed: Mar. 8, 1982

Related U.S. Application Data

[63] Continuation of Ser. No. 188,586, Sep. 18, 1980, abandoned.

[30] Foreign Application Priority Data

Oct. 25, 1979 [CH] Switzerland ........................ 9566/79

[51] Int. Cl.³ .............................................. B01F 3/04
[52] U.S. Cl. ...................................... 261/97; 202/158; 261/110; 261/113
[58] Field of Search ............. 261/97, 110, 113, 114 R, 261/114 JP, 114 TC; 202/158

[56] References Cited

U.S. PATENT DOCUMENTS

| | | | |
|---|---|---|---|
| 1,738,870 | 12/1929 | Cox et al. ................... | 261/114 R X |
| 1,744,134 | 1/1930 | Morrell ......................... | 261/113 X |
| 1,808,088 | 6/1931 | Urquhart ...................... | 261/114 R |
| 2,006,986 | 7/1935 | Florez ............................ | 261/114 R |
| 2,072,382 | 3/1937 | Robinson ...................... | 261/113 |
| 2,647,855 | 8/1953 | Grunewald et al. ........... | 261/113 X |
| 3,290,024 | 12/1966 | Huber ........................... | 261/97 X |
| 3,425,810 | 2/1969 | Scott, Jr. ..................... | 261/113 |
| 3,446,489 | 5/1969 | Leva ............................. | 261/113 |
| 3,697,230 | 10/1972 | Fujimto et al. ............... | 261/114 R |
| 3,997,633 | 12/1976 | Leva et al. .................... | 261/113 |
| 4,226,678 | 10/1980 | Mende et al. ................. | 261/114 R X |

FOREIGN PATENT DOCUMENTS

| | | | |
|---|---|---|---|
| 539,956 | 2/1976 | U.S.S.R. | |
| 1004046 | 9/1965 | United Kingdom . | |
| 1097992 | 1/1968 | United Kingdom ............ | 261/97 |
| 1364649 | 8/1974 | United Kingdom . | |
| 1383876 | 2/1975 | United Kingdom ............ | 261/97 |

*Primary Examiner*—Richard L. Chiesa
*Attorney, Agent, or Firm*—Kenyon & Kenyon

[57] ABSTRACT

A tray device has a plurality of chimneys which extend above the level of liquid in the tray and have vapor outlets for the passage of the rising vapor. Tubes are also provided in the tray device with liquid inlets for the passage of liquid from the tray downwardly onto the lower exchange section. The tray device intercepts the liquid trickling down from an upper exchange section and distributes the liquid uniformly through the tubes over the top cross section of the exchange section immediately below. The vapor rising from the bottom section passes through the chimneys separately from the liquid.

2 Claims, 8 Drawing Figures

TRAY DEVICE FOR COLLECTING AND DISTRIBUTING LIQUID FOR A COUNTER-CURRENT COLUMN

This is a continuation, of application Ser. No. 188,586 filed Sept. 18, 1980, and now abandoned.

This invention relates to a tray device for collecting and distributing liquid for a counter-current column.

As is known, various types of counter-current columns have been used, for example, for distillation, rectification, extraction, absorption, separation of isotopes from a substance by means of a chemical exchange reaction and heat exchange between a liquid and a vapor or gas. Conventional transfer columns of this kind generally have exchange sections containing regular packings, for example, fluted plate-like elements or statistical packings, for example, Raschig rings or bunches of vertical parallel ducts in order to facilitate a liquid-to-vapor exchange. If the exchange sections are of relatively large diameter, the various ducts can be filled with packings while if the ducts are of small diameter, the column takes the form of a so-called film column.

It has also been known to provide various types of means for distributing liquid across the cross-section of a mass transfer section of a counter-current column in an attempt to achieve a uniform distribution of the liquid.

Generally, the effect—separation in the case of distillation and the like and heat exchange in the other case—depends mainly upon the liquid being distributed uniformly and finely over the surface of an exchange section. Another important consideration in columns having a number of exchange sections is for the descending liquid to be collected between consecutive sections in order that any difference in concentration can be balanced out at least fairly thoroughly before the liquid trickles down in finely divided form onto the surface of the exchange section immediately below.

One known collecting and distributing means is described in U.S. Pat. No. 3,290,024. However, the collecting and distributing means described therein has a serious disadvantage in that the collector and the distributor are made in two separate units. As a result, the overall height of the collecting and distributing means is substantial. In turn, the column is of relatively large height and of costly construction.

In another case, for example as described in British Pat. No. 1,364,649, a so-called duct type distributor has a plurality of intercommunicating ducts which are formed with holes in the bottom cross-sectional region and with slots at the top edges. In this case, liquid can flow through the slots and be supplied over the whole column cross-section. However, the liquid discharging from an upper section of this distributor is not collected. Thus, differences in the concentration in the liquid discharge from an upper exchange section cannot be evened out before the liquid passes to the next exchange section below. Further, the liquid overflowing though the slots is not separated from the vapor. Consequently, liquid is entrained by the vapor at vapor speeds of more than approximately two to three meters per second. The column loading is thus very limited and operation becomes unreliable since the liquid egress orifices become soiled and clog readily.

Russian Pat. No. 539,596 describes a tray device for distributing liquid over the surfaces of the exchange sections of a column with some of the liquid from an upper exchange section being intercepted. In this construction, a number of chimneys or the like are distributed in the base of the device. Such a device is also known as a "funnel distributor". Thus, both the vapor and the liquid descending in counter-current thereto flow through the chimneys. As a result, rapid entrainment of the liquid in the chimneys is unavoidable. In conventional funnel distributors in which the liquid is applied only at the center of the column, the clear or free cross-section available for the flow of vapor through the funnels and the annular marginal zone around the device—the zone bounded externally by the wall of the column—is usually from the thirty-five percent (35%) to forty percent (40%) of the cross-section of the complete column.

In another known device, vapor chimneys which are open at the top are disposed in a tray having a base in the form of a screen through which the liquid discharges. However, in this case, liquid also discharges through the vapor chimneys and may be carried on by the vapor at least at high vapor speeds. Further, the screen orifices may easily become clogged by dirt, thus impairing uniform distribution of the liquid over the complete cross-section of the exchange section immediately below the device.

Usually the vapor load of counter-current columns, the so-called F factor is from 2–3 based on the empty column. The F factor is defined by the equation:

$$F = w_D \sqrt{\rho D}$$

wherein, $w_D$ denotes the vapor speed and $\rho_D$ the vapor density. In the above described chimneys the F factor rises to about 5 to 9 because of the reduced cross-sectional are available for the vapor. When liquid and vapor flow in counter-current, the liquid starts to be entrained at an F factor of approximately 5 or 6. Thus, the column vapor loading is significantly reduced.

Accordingly, it is an object of the invention to provide a device for collecting and distributing liquid in a counter-current column which is unaffected by dirt.

It is another object of the invention to provide a liquid collecting and distributing device for a counter-current column which does not limit the loadability of the column.

It is another object of the invention to provide a liquid collecting and distributing device which has a high separating ability, which produces optimum heat exchange yet is of simple construction and minimal overall height.

Briefly, the invention provides a tray device for collecting and distributing liquid for a counter-current column having discrete exchange zones therein. The tray device is comprised of a base, a plurality of upstanding chimneys distributed over the base and a plurality of tubes disposed in the base between the chimneys. In addition, each chimney has a covering at a top end and at least one vapor outlet above the base for passage of vapor rising upwardly through the chimney. Each tube has at least one liquid inlet below the vapor outlets in the chimneys for passage of a liquid downwardly through the respective tubes.

Since the vapor and liquid are conveyed through the tray device separately from one another, the vapor cannot entrain the liquid. Hence, the vapor loading can be increased as desired and column performance substantially improved. Further, the tray device provides a very uniform distribution of the trickling liquid over the exchange sections.

The liquid outlets in the tubes are disposed laterally, for example, in the form of a hole-like orifice in the side wall of the tube. Thus, the risk of clogging disappears since any dirt or soil or the like, such as rust, settles onto the tray base.

The tray device is constructed as a unit with both a collector and a distributor, the unit being much shorter in height than previously known devices. As a result, there is a consequent reduction in the overall height of the column in which the tray device is used.

These and other objects and advantages of the invention will become more apparent from the detail description taken in conjunction with the accompanying drawings wherein.

Figure 1:
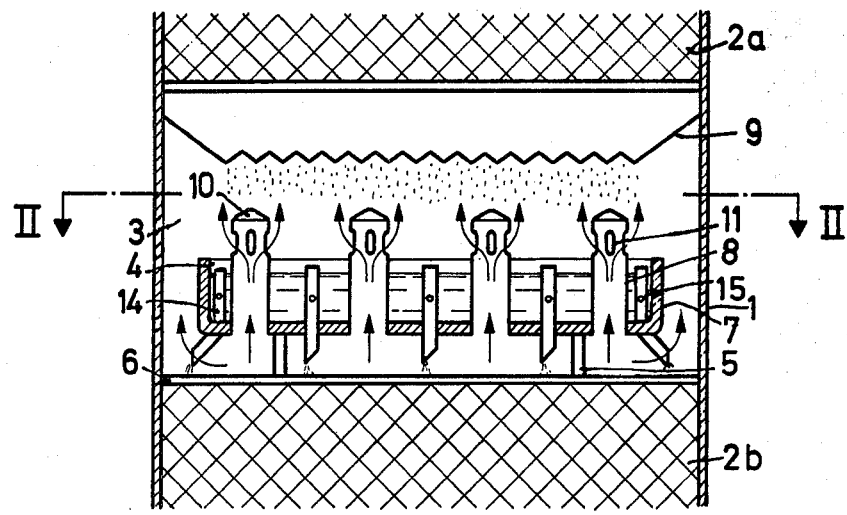
FIG. 1 illustrates a diagramatic view in longitudinal section of a counter-current column utilizing a tray device according to the invention.

Referring to FIG. 1, the counter-current column is constructed as a mass transfer column 1 having exchange sections or zones 2a, 2b disposed along a vertical axis. Each of the exchange sections or zones 2a, 2b is comprised, for example, of packings in the form of fluted strip-like elements such as described in British Pat. No. 1,004,046. As indicated, the exchange sections or zones 2a, 2b are separated vertically from one another to define a gap 3 there between.

A tray device 4 for collecting and distributing liquid is disposed in each gap 3. As indicated, the tray device 4 is supported by rods 5 on a grating 6 placed on the lower exchange section 2b. Alternatively, the tray device 4 can be supported directly on the exchange section 2b in which case, the exchange section is made as a packing element. The tray device 4 can be made, for example, of metal, glass or graphite. In addition, the tray device 4 has a base 7 in the form of a cylindrical tray or trough. As shown, an edge zone is left clear between the base 7 and the peripheral wall of the column 1 to permit rising vapor to flow through.

As shown, a guide funnel 9 is provided at the exit end of the upper exchange section 2a. This funnel 9 has a serrated bottom edge and serves for the discharge of liquid from the marginal zone of the section 2a onto the tray device 4.

Figure 2:
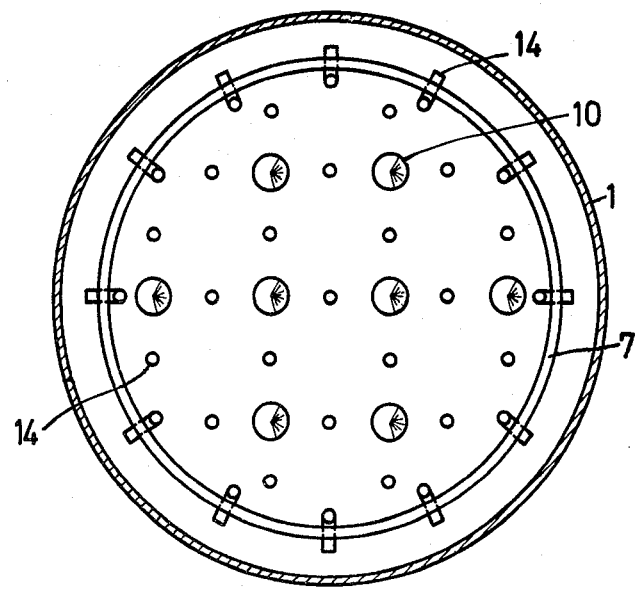
FIG. 2 illustrates a view taken on line II—II of FIG. 1.
Figures 4A, 4B:
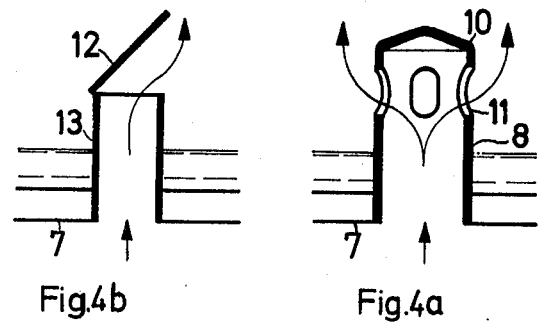
FIG. 4a illustrates a chimney according to the invention having a closed top.
FIG. 4b illustrates a chimney according to the invention having an open top.
Figure 3:
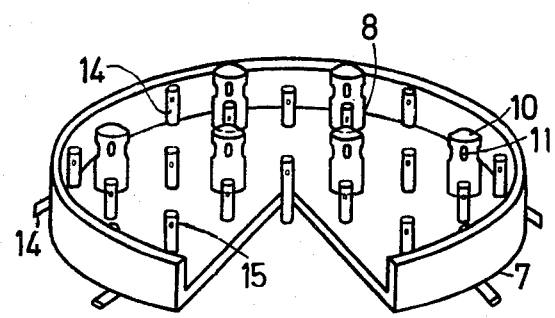
FIG. 3 illustrates a part perspective view of a tray device according to the invention.

Referring to FIGS. 1-3, the tray device 4 also has a plurality of upstanding chimneys 8 distributed over the base 7. Each chimney 8, as shown in FIG. 4a, has a hood-like covering 10 at the top end which is disposed above the liquid level in the device 4. In addition, each chimney 8 has a ring of vapor outlets 11 above the base 7 for passage of vapor which rises upwardly through the chimneys 8. If only one vapor outlet 11 is used, the cross-section is conveniently made the same size as the cross-section of the chimney 8 in order to reduce the pressure drop.

Alternatively, as shown in FIG. 4b, each chimney 13 may have a covering in the form of an inclined plate or the like 12 so that the vapor may issue from the top end of the chimney 13. In either embodiment, the covering 10, 12 at the top of each chimney serves to keep liquid out of the chimneys.

Referring to FIGS. 1 and 2, the tray device 4 also has a plurality of tubes 14 disposed in the base 7 between the chimneys 8. Each of these tubes 14 has at least one liquid inlet 15 below the vapor outlets 11 for passage of liquid downwardly through the tube 14 (see FIG. 5a). The liquid inlets 15 are disposed above the base 7 by an amount of for example, 10 milimeters to 50 milimeters. Thus, the inlets 15 cannot become clogged by soil in operation since the soil would settle on the base 7. Further, by disposing the liquid inlets 15 in the side wall of the tubes 14, the inlet diameter can be such that an inflow height above the inlet 15, for example, of at least from 10 milimeters to 20 milimeters, is provided. Consequently, even if the tray device 4 is not disposed dead horizontally in the column 1, a uniform distribution of the liquid is only slightly impaired.

In order to vary the throughput of liquid over a wide range, two or more rows of liquid inlets 15 (not shown), one above the other, may be provided in the tubes 14. Also, a liquid inlet may be provided above the base 7 while a second nozzle for the liquid outlet is provided below the base 7.

Figures 5A, 5B, 5C:
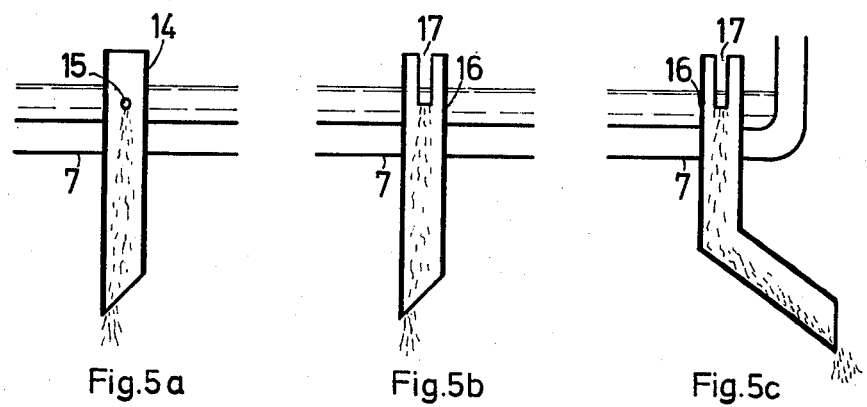
FIG. 5a illustrates a tube according to the invention having a hole-like orifice therein.
FIG. 5b illustrates a tube according to the invention having an overflow slot for liquids.
FIG. 5c illustrates a further modified tube according to the invention having an outwardly bent bottom portion.

As shown in FIGS. 1 and 5a, each of the tubes 14 is beveled at the bottom edge in order to achieve a defined liquid stream.

In operation, for example, during a mass transfer between a descending liquid and a rising vapor, the liquid trickles down from the exchange section 2a via the funnel 9 onto the tray device 4. At the same time, vapor rises upwardly from the exchange section 2b into the gap 3. As indicated in FIG. 1, the liquid descending via the funnel 9 trickles down onto the tray device 4 and fills the device 4 up to a level within the device 4. The vapor, on the other hand, passes about the periphery of the tray device 4 while also moving up through the chimneys 8 as indicated by the arrows. The collected liquid thereafter passes through the liquid inlets 15 in the tubes 14 and trickles down onto the lower exchange section 2b whereas the vapor passes through the vapor outlets 11 in the respective chimneys 8. Since the vapor outlets 11 are disposed above the top edge of the base 7, the liquid level cannot reach the vapor outlets 11. Thus, the liquid does not become entrained by the vapor. Further, any unbalance in the liquid trickling onto the tray device 4 is evened out within the tray device 4 before the liquid passes through the tubes 14 onto the lower section 2b.

Referring to FIG. 5b, each tube 16 may, alternatively, be provided with one or more overflow slots 17. In this case, the presence of the overflow slots 17 requires the tray device to be fitted dead horizontally in the column. If the slots 17 are of appropriate size, however, a desired minimum liquid level can be insured in the slots 17 for a corresponding throughput of liquid.

It may also be convenient, particularly in the case of multi-purpose columns having a wide liquid range, for the tubes to be formed with both overflow slots and liquid outlets in the sidewall.

Referring to FIG. 5c, the tubes 14, 16 located near the periphery of the base 7 have outwardly bent lower portions which are directed toward the wall of the column 1. This insures a uniform supply of liquid even at the edge zone of the exchange section 2b.

The invention thus provides a tray device wherein liquid and vapor can be conveyed separately. Thus, the vapor cannot entrain the liquid and a high-loading column can be provided. In this respect, the tray device provides a high F factor of 10 and more.

What is claimed is:

1. In combination,
a counter-current column having a peripheral wall and at least a pair of discrete spaced apart exchange zones containing packings therein disposed along a vertical axis; and
a tray device between said exchange zones for collecting and distributing liquid separately from a vapor, said tray device comprising a base having an edge zone spaced from said column wall to permit rising vapor to flow therebetween, a plurality of upstanding chimneys distributed over said base for distribution of the rising vapor, each said chimney having a covering at a top end to prevent entry of liquid therein and at least one vapor outlet above said base for passage of vapor rising upwardly through said respective chimneys separately from the descending liquid, and a plurality of tubes disposed in and extending through said base between said chimneys for uniformly distributing liquid into an exchange zone therebelow, each said tube having at least one liquid inlet below said vapor outlets in said chimneys and above said base for passage of liquid downwardly through said respective tube and a plurality of said tubes adjacent said edge zone of said base having outwardly and downwardly bent lower portions directed towards said column wall.

2. The combination as set forth in claim 1 wherein said vapor outlet is of a cross-section of the same size as the cross-section of said respective chimney.

* * * * *